United States Patent

Bremser et al.

(10) Patent No.: US 6,706,333 B2
(45) Date of Patent: Mar. 16, 2004

(54) AQUEOUS COATING SUBSTANCES FOR IMPARTING A COLOR AND/OR EFFECT AND USE THEREOF FOR PRODUCING DEFORMABLE LAMINATES FOR IMPARTING A COLOR AND/OR EFFECT

(75) Inventors: Wolfgang Bremser, Münster (DE); Horst Hintze-Brüning, Münster (DE); Walter Lassmann, Munster (DE)

(73) Assignee: BASF Coatings AG, Munster (DE)

( * ) Notice: Subject to any disclaimer, the term of this patent is extended or adjusted under 35 U.S.C. 154(b) by 4 days.

(21) Appl. No.: 10/276,030

(22) PCT Filed: Jun. 12, 2001

(86) PCT No.: PCT/EP01/06616

§ 371 (c)(1),
(2), (4) Date: Dec. 16, 2002

(87) PCT Pub. No.: WO01/96484

PCT Pub. Date: Dec. 20, 2001

(65) Prior Publication Data

US 2003/0162888 A1 Aug. 28, 2003

(30) Foreign Application Priority Data

Jun. 16, 2000 (DE) .......................................... 100 29 802

(51) Int. Cl.$^7$ .............................. B05D 3/02; B05D 3/06
(52) U.S. Cl. .................... 427/493; 427/359; 427/385.5; 427/407.1; 427/409
(58) Field of Search .............................. 427/385.5, 493, 427/407.1, 409, 359

(56) References Cited

U.S. PATENT DOCUMENTS

| | | | | |
|---|---|---|---|---|
| 4,246,382 A | 1/1981 | Honda et al. | .................. | 526/79 |
| 4,413,036 A | 11/1983 | Drexler et al. | .............. | 428/458 |
| 5,516,559 A | 5/1996 | Röckrath et al. | ........ | 427/407.1 |
| 5,576,286 A | 11/1996 | Kempter et al. | .............. | 526/88 |
| 5,690,569 A | 11/1997 | Ledvina et al. | ............. | 474/111 |
| 5,726,258 A | 3/1998 | Fischer et al. | ................ | 526/64 |
| 5,854,353 A | 12/1998 | Knoll et al. | ................. | 525/314 |
| 6,410,646 B1 | 6/2002 | Röckrath et al. | ........... | 525/124 |
| 6,509,096 B1 | 1/2003 | Ott et al. | ................. | 428/411.1 |
| 2001/0002274 A1 | 5/2001 | Lessmeister et al. | ........ | 427/195 |
| 2003/0022985 A1 | 1/2003 | Röckrath et al. | ........... | 524/589 |

FOREIGN PATENT DOCUMENTS

| | | |
|---|---|---|
| CA | 2004988 | 12/1989 |
| DE | 2848906 | 5/1979 |
| DE | 3841540 | 6/1990 |
| DE | 4204518 | 8/1993 |
| DE | 19524182 | 1/1997 |
| DE | 19709476 | 11/1997 |
| DE | 19632426 | 1/1998 |
| DE | 19709465 | 9/1998 |
| DE | 19908018 | 8/2000 |
| DE | 19920141 | 1/2001 |
| DE | 19930067 | 1/2001 |
| DE | 19930665 | 1/2001 |
| DE | 10001442 | 10/2001 |
| EP | 0052776 | 10/1981 |
| EP | 447428 | 11/1989 |
| EP | 593454 | 3/1991 |
| EP | 554783 | 1/1993 |
| EP | 650979 | 10/1994 |
| WO | WO8202387 | 7/1982 |
| WO | WO95/27742 | 10/1995 |
| WO | WO95/34586 | 12/1995 |
| WO | WO 95/34586 | 12/1995 |
| WO | WO96/15157 | 5/1996 |
| WO | WO9837104 | 8/1998 |
| WO | WO 2001/42310 | * 6/2001 |

OTHER PUBLICATIONS

English Language Abstract for WO95/34586 on front page of International Search Report.
English Language Abstract DE19930665.
English Language Abstract DE19930067.
English Language Abstract EP 0650 979.
English Language Abstract EP 0 593 454.
English Language AbstractDE19908018.

* cited by examiner

*Primary Examiner*—Erma Cameron

(57) ABSTRACT

The use of a copolymer (A) preparable by free-radical polymerization of
a) at least one olefinically unsaturated monomer, and
b) at least one olefinically unsaturated monomer different than the olefinically unsaturated monomer (a), of the general formula I $$R^1R^2C{=}CR^3R^4 \qquad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;
in an aqueous medium; to produce deformable color and/or effect laminates and dry-paint films.

19 Claims, No Drawings

AQUEOUS COATING SUBSTANCES FOR IMPARTING A COLOR AND/OR EFFECT AND USE THEREOF FOR PRODUCING DEFORMABLE LAMINATES FOR IMPARTING A COLOR AND/OR EFFECT

This application is a National Phase Application of Patent Application PCT/EP01/06616 filed on Jun. 12, 2001.

The present invention relates to novel aqueous color and/or effect coating materials. The present invention also relates to the use of the novel coating materials to produce novel deformable color and/or effect laminates. The present invention further relates to a novel process for producing deformable color and/or effect laminates. Moreover, the present invention relates to the use of the novel deformable laminates to produce novel shaped color and/or effect parts.

Aqueous color and/or effect coating materials have been known for a long time. They are used in particular as solid-color topcoats or basecoats, especially aqueous basecoats, to produce multicoat color and/or effect coating systems. Solid-color topcoats or basecoats of this kind are described in detail, for example, in the patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1, EP 0 496 205 A1, EP 0 358 979 A1, EP 469 389 A1, DE 24 46 442 A1, DE 34 09 080 A1, DE 195 47 944 A1, DE 197 41 554.7 A1 and EP 0 817 684, column 5, lines 31 to 45. These are polyurethane-based coating materials.

These solid-color topcoats and basecoats give color and/or effect topcoats and basecoats having outstanding optical properties. The basecoats in particular are notable for outstanding dichroic effects and/or metallic effects.

A disadvantage of the known solid-color topcoats and basecoats is that they still always include comparatively large amounts of organic solvents. This is necessary in order to disperse the color and/or effect pigments effectively in the solid-color topcoats and basecoats, and to bring about effective leveling of the coating materials. Moreover, the known solid-color topcoats and basecoats are difficult to deform, making them unsuitable for the production of deformable color and/or effect laminates.

On the other hand, color coating materials are known which provide coatings that are deformable to a high-extent. These materials are used in particular for coating coils, as part of the coil coating process.

Coil coating is the term used for a special form of roller coating (Römpp Lexikon Lacke und Druckfarben, Georg Thieme Verlag, Stuttgart, N.Y., 1998, page 617, "Roller coating") and also, occasionally, the spray and flow coating of metal strips with liquid coating materials. It comprises a continuous process, i.e., all operations such as cleaning, pretreatment, painting and curing, etc., are conducted in one operation in one installation. Schematically, the steps involved in coil coating are as follows: following the cleaning and degreasing of the strip, there is a multistage chemical pretreatment with subsequent passivation, rinsing, and drying. After cooling, the liquid coating material is applied to one or two sides using two or three rolls, usually by the reverse roller coating technique. After a very short evaporation time, the applied coat is cured at temperatures from 180 to 260° C. for from 10 to 60 s. For the production of a multicoat system, application and curing are repeated. The speeds of coil coating lines are up to 250 m/min (Römpp Lexikon Lacke und Druckfarben, Georg Thieme Verlag, Stuttgart, N.Y., 1998, page 55, "Coil coating").

The liquid coating materials used to date for coil coating, however, lead to considerable emissions of organic solvents, which economically and environmentally is no longer acceptable.

Attempts have therefore been made to replace the conventional coil coating materials by solvent-free powder coating materials. In relation to the liquid coating materials it is a disadvantage, however, that the necessary powder coating thicknesses are very high. They are in fact between 40 and 50 $\mu$m. If the powder coating materials are applied more thinly, the coating is no longer pore-free. This leads to optical defects and sites for corrosive attack.

German Patent Application DE 196 32 426 A1 discloses a coil coating process using a very fine powder coating material with very narrow particle size distribution, which permits the production of pore-free coatings with a dry film thickness of less than 10 $\mu$m. A disadvantage is that the preparation of the very fine powder coating material is comparatively difficult.

Generally, coil coating with powder coating materials has the disadvantage of the need to use special application installations such as electrostatic powder spraying units in the case of slow-moving coils or so-called powder cloud chambers in the case of fast-moving coils.

German Patent Applications DE 199 08 013.5, DE 199 20 141.2, DE 199 08 018.6 and DE 100 01 442.9, unpublished at the priority date of the present specification, propose using aqueous pigmented and unpigmented powder slurries for coil coating. How this is to be done in detail, however, is not described.

Overall, the known coating materials, which are very suitable for the coil coating process, give color coatings whose optical properties fail to match those of the known color and/or effect basecoats and topcoats.

Also known are color coating materials that are outstandingly suitable for producing self-supporting dry-paint films and paint sheets, or for coating films. Here again, the optical properties are not entirely satisfactory.

Consequently, the known coating materials, which give highly deformable coatings and/or dry-paint films, have also as yet been unable to establish themselves in such demanding applications as that of OEM automotive finishing, especially the finishing of top-class automobiles.

On the other hand, increasing numbers of auto makers wish to reduce their manufacturing effort by—rather than they themselves painting the automobile bodies—buying in prefabricated, painted bodywork parts from suppliers and assembling them into bodies, or laminating prefabricated dry-paint films onto the bodywork parts or bodies.

The suppliers in turn, which carry out the coil coating processes or produce the dry-paint films, desire on environmental grounds, in order to reduce the organic emissions, to make use as far as possible of coating materials which contain no organic solvents.

Owing to their known high profile of properties, coating materials and coatings based on acrylate copolymers could offer an alternative to the known water-based coating materials, on the one hand, and to the coating materials commonly used for the coil coating process. Coating materials based on acrylate copolymers are described, for example, in the patents EP 0 447 428 B1, EP 0 593 454 B1, EP 0 052 776 B1 and DE 42 04 518 A1.

Acrylate copolymers may be prepared by widely and well-known polymerization techniques in bulk, solution, or emulsion. Polymerization processes for preparing acrylate copolymers, especially polyacrylate resins, are common knowledge and have been described many times (cf., e.g., Houben-Weyl, Methoden der organischen Chemie, 4th edition, volume 14/1, pages 24 to 255 (1961)).

Further examples of suitable copolymerization processes for preparing acrylate copolymers are described in the patents DE 197 09 465 A1, DE 197 09 476 C1, DE 28 48 906 A1, DE 195 24 182 A1, EP 0 554 783 A1, EP 0 650 979 B1, WO 95/27742A, DE 38 41 540 A1 and WO 82/02387 A.

However, free-radical addition polymerization employed to prepare acrylate copolymers is frequently very exothermic and difficult to control. What this means for the reaction regime is that high concentrations of monomers and/or the so-called batch procedure, where the total amount of the monomers is introduced as initial charge in an aqueous medium, emulsified and subsequently polymerized to completion, must be avoided. In addition, the targeted establishment of defined molecular weights, molecular weight distributions and other properties often causes difficulties. The targeted establishment of a defined profile of properties in acrylate copolymers is, however, of great importance for their use as binders in color and/or effect coating materials, since by this means it is possible to exert direct influence on the performance properties profile of the color and/or effect coating materials and coatings.

There has therefore been no lack of attempts to regulate the free-radical copolymerization of olefinically unsaturated monomers.

For instance, International Patent Application WO 98/01478 A describes a process in which the copolymerization is conducted in the presence of a free-radical initiator and of a thiocarbonylthio compound as chain transfer agent.

International Patent Application WO 92/13903 A describes a process for preparing copolymers of low molecular weight by free-radical chain polymerization in the presence of a group transfer agent having a carbon-sulfur double bond. These compounds act not only as chain transfer agents but also as growth regulators, and so result only in copolymers of low molecular weight.

International Patent Application WO 96/15157 A discloses a process for preparing copolymers having a comparatively narrow molecular weight distribution, in which a monomer is reacted with a vinyl-terminated macromonomer in the presence of a free-radical initiator.

Furthermore, International Patent Application WO 98/37104 A discloses the preparation of acrylate copolymers having defined molecular weights by free-radical polymerization in the presence of a chain transfer agent having a carbon-carbon double bond and having radicals which activate this double bond in respect of the free-radical addition of monomers.

Despite significant progress in this field, there continues to be a lack of a universally applicable process of controlled free-radical polymerization which yields chemically structured polymers, especially acrylate copolymers, in a simple manner and by means of which it is possible to tailor the profile of properties of the copolymers in respect of their application in color and/or effect coating materials.

With the color and/or effect coating materials based on acrylate copolymers, as well, therefore, it continues to be necessary to vary the profile of properties by means of other measures, which are in some cases relatively complex.

German Patent Application DE 199 30 067.4, unpublished at the priority date of the present specification, describes the use of acrylate copolymers containing diphenylethylene in copolymerized form for preparing surfacer coats and antistonechip primers. The patent application does not reveal whether these coatings are readily deformable.

German Patent Application DE 199 30 665, unpublished at the priority date of the present specification, describes the use of acrylate copolymers containing diphenylethylene in copolymerized form for the preparation of color and/or effect basecoat materials. The basecoat materials are used to produce color and/or effect basecoats as part of multicoat color and/or effect coating systems. Whether these basecoats per se are sufficiently deformable to be suitable for producing deformable color and/or effect laminates, and dry-paint films is not revealed by the patent application.

It is an object of the present invention to provide novel aqueous color and/or effect coating materials whose profile of properties in respect of their use may be adjusted without problems, which give rise to very little or no organic emissions in the course of preparation, application, and in curing, and which give coatings which are very readily deformable and have outstanding color and/or effect properties.

The profile of properties is to be established in a simple and targeted manner through the use of chemically structured copolymers obtainable by free-radical polymerization. Furthermore, these chemically structured copolymers should be suitable for use as grinding resins, which advantageously permit the provision of excellently incorporable pigment pastes for the preparation of novel color and/or effect coating materials.

Accordingly, we have found the novel use of a copolymer (A) to produce deformable color and/or effect coatings, said copolymer (A) being preparable by free-radical polymerization of a) at least one olefinically unsaturated monomer, and
b) at least one olefinically unsaturated monomer different than the olefinically unsaturated monomer (a), of the general formula I $$R^1R^2C\!\!=\!\!CR^3R^4 \qquad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;
in an aqueous medium.

In the text below, the novel use of the copolymer (A) is referred to as "use in accordance with the invention".

We have also found the novel aqueous color and/or effect coating material comprising A) as binder, at least one copolymer preparable by free-radical polymerization of
a) at least one olefinically unsaturated monomer, and
b) at least one olefinically unsaturated monomer different than the olefinically unsaturated monomer (a), of the general formula I $$R^1R^2C\!\!=\!\!CR^3R^4 \qquad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;
in an aqueous medium; and
B) at least one color and/or effect pigment in an amount such as to give a pigment/binder or pigment plus filler/binder ratio of (B) to (A) of 10:1 to 1:300.

In the text below, the novel color and/or effect coating material is referred to as "coating material of the invention".

Furthermore, we have found the novel coil coating process in which a coil is coated continuously on one or two sides with at least one coating material, after which the applied film(s) is (are) cured, wherein at least one of the coating materials is an aqueous color and/or effect coating material comprising
A) as binder, at least one copolymer preparable by free-radical polymerization of
  a) at least one olefinically unsaturated monomer, and
  b) at least one olefinically unsaturated monomer different than the olefinically unsaturated monomer (a), of the general formula I

$$R^1R^2C=CR^3R^4 \qquad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;
  in an aqueous medium.

In the text below, the novel coil coating process is referred to as "coating process of the invention".

In the light of the prior art it was surprising and unexpected for the skilled worker that the problem on which the present invention is based could be solved in its essence by the use in accordance with the invention. In particular it was surprising that the preparation of the copolymers (A) could be steered in such a way as to give the coating materials of the invention, which give color and/or effect coatings ("coatings of the invention") which are of particularly high optical quality and, moreover, are readily deformable. A further surprise was that the coating materials of the invention are outstandingly suitable for the production of coatings of the invention on deformable laminates or as deformable dry-paint films.

In accordance with the invention, at least one copolymer (A) is used as the binder, or one of the binders, in the coating material of the invention.

In accordance with the invention, the copolymer (A) is prepared by free-radical polymerization of at least one olefinically unsaturated monomer (a) and at least one olefinically unsaturated monomer (b) which is different than the monomer (a).

Examples of suitable monomers (a) are
(a1) essentially acid-group-free (meth)acrylic esters such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol acrylate or tert-butylcyclohexyl (meth)acrylate; (meth)acrylic oxaalkyl esters or oxacycloalkyl esters such as ethyltriglycol (meth)acrylate and methoxyoligoglycol (meth)acrylate having a molecular weight Mn of preferably 550, or other ethoxylated and/or propoxylated hydroxyl-free (meth)acrylic acid derivatives. These may contain minor amounts of (meth)acrylic alkyl or cycloalkyl esters of higher functionality, such as the di(meth)acrylates of ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol; trimethylolpropane di- or tri(meth)acrylate; or pentaerythritol di-, tri- or tetra(meth)acrylate. For the purposes of the present invention, minor amounts of monomers of higher functionality in this case are to be understood as amounts which do not lead to crosslinking or gelling of the copolymers (A).
(a2) Monomers which carry per molecule at least one hydroxyl group, amino group, alkoxymethylamino group or imino group and are essentially free from acid groups, such as hydroxyalkyl esters of acrylic acid, methacrylic acid or another alpha,beta-olefinically unsaturated carboxylic acid, which derive from an alkylene glycol esterified with the acid, or which are obtainable by reacting the alpha,beta-olefinically unsaturated carboxylic acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsilon-caprolactone, for example, and these hydroxyalkyl or hydroxycycloalkyl esters; or olefinically unsaturated alcohols such as allyl alcohol or polyols such as trimethylolpropane monoallyl or diallyl ether or pentaerythritol monoallyl, diallyl or triallyl ether (as far as these monomers (a2) of higher functionality are concerned, the comments made above relating to the monomers (a1) of higher functionality apply analogously); N,N-dimethylaminoethyl acrylate, N,N-diethylaminoethyl methacrylate, allylamine or N-methyliminoethyl acrylate or N,N-di(methoxymethyl)aminoethyl acrylate and methacrylate or N,N-di(butoxymethyl)aminopropyl acrylate and methacrylate; monomers of this kind are used preferably to prepare selfcrosslinking copolymers (A).
(a3) Monomers which carry per molecule at least one acid group which may be converted to the corresponding acid anion group, such as acrylic acid, methacrylic acid, ethacrylic acid, crotonic acid, maleic acid, fumaric acid or itaconic acid; olefinically unsaturated sulfonic or phosphonic acids or their partial esters; or mono(meth)acryloyloxyethyl maleate, succinate or phthalate.
(a4) Vinyl esters of alpha-branched monocarboxylic acids having 5 to 18 carbon atoms in the molecule. The branched monocarboxylic acids can be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or, respectively, with carbon monoxide and water produces a mixture of carboxylic acids in which the carboxyl groups are located predominantly on a quaternary carbon atom. Examples of other olefinic starting materials are propylene trimer, propylene tetramer and diisobutylene. Alternatively, the vinyl esters (a4) may be prepared in a conventional manner from the acids, by reacting, for example, the acid with acetylene. Particular preference, owing to their ready availability, is given to using vinyl esters of saturated aliphatic monocarboxylic acids having 9 to 11 carbon atoms that are branched on the alpha carbon atom, especially Versatic® acids.

(a5) Reaction products of acrylic acid and/or methacrylic acid with the glycidyl ester of an alpha-branched monocarboxylic acid having 5 to 18 carbon atoms per molecule, in particular a Versatic® acid, or, instead of the reaction product, an equivalent amount of acrylic and/or methacrylic acid which is then reacted during or after the polymerization reaction with the glycidyl ester of an alpha-branched monocarboxylic acid having 5 to 18 carbon atoms per molecule, especially a Versatic® acid.

(a6) Cyclic and/or acyclic olefins such as ethylene, propylene, 1-butene, 1-pentene, 1-hexene, cyclohexene, cyclopentene, norbornene, butadiene, isoprene, cyclopentadiene and/or dicyclopentadiene.

(a7) (Meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl-, N,N-cyclohexylmethyl- and/or N-methylol-, N,N-dimethylol-, N-methoxymethyl-, N,N-di(methoxymethyl)-, N-ethoxymethyl- and/or N,N-di(ethoxyethyl)-(meth)acrylamide. Monomers of the last-mentioned kind are used in particular to prepare selfcrosslinking copolymers (A).

(a8) Monomers containing epoxide groups, such as the glycidyl ester of acrylic acid, methacrylic acid, ethacrylic acid, crotonic acid, maleic acid, fumaric acid and/or itaconic acid.

(a9) Vinylaromatic hydrocarbons such as styrene, alpha-alkylstyrenes, especially alpha-methylstyrene, and/or vinyltoluene; vinylbenzoic acid (all isomers), N,N-diethylaminostyrene (all isomers), alpha-methylvinylbenzoic acid (all isomers), N,N-diethylamino-alpha-methylstyrene (all isomers) and/or p-vinylbenzenesulfonic acid.

(a10) Nitriles such as acrylonitrile and/or methacrylonitrile.

(a11) Vinyl compounds, especially vinyl halides and/or vinylidene dihalides such as vinyl chloride, vinyl fluoride, vinylidene dichloride or vinylidene difluoride; N-vinylamides such as vinyl-N-methylformamide, N-vinylcaprolactam, 1-vinylimidazole or N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

(a12) Allyl compounds, especially allyl ethers and allyl esters such as allyl methyl, ethyl, propyl or butyl ether or allyl acetate, propionate or butyrate.

(a13) Polysiloxane macromonomers having a number-average molecular weight Mn of from 1000 to 40,000 and having on average from 0.5 to 2.5 ethylenically unsaturated double bonds per molecule; especially polysiloxane macromonomers having a number-average molecular weight Mn of from 2000 to 20,000, with particular preference from 2500 to 10,000 and, in particular, from 3000 to 7000 and having on average from 0.5 to 2.5, preferably from 0.5 to 1.5, ethylenically unsaturated double bonds per molecule, as are described in DE 38 07 571 A 1 on pages 5 to 7, in DE 37 06 095 A 1 in columns 3 to 7, in EP 0 358 153 A 1 on pages 3 to 6, in U.S. Pat. No. 4,754,014 A in columns 5 to 9, in DE 44 21 823 A 1 or in the international Patent Application WO 92/22615 A on page 12, line 18 to page 18, line 10.

(a14) Acryloxysilane-containing vinyl monomers, preparable by reacting hydroxy-functional silanes with epichlorohydrin and then reacting the reaction product with (meth)acrylic acid and/or with hydroxyalkyl and/or hydroxycycloalkyl esters of (meth)acrylic acid (cf. monomers a2).

Each of the abovementioned monomers (a1) to (a14) may be polymerized alone with the monomers (b). In accordance with the invention, however, it is advantageous to use at least two monomers (a), since by this means it is possible to vary the profile of properties of the resulting copolymers (A) very widely, in a particularly advantageous manner, and to tailor said profile of properties to the particular intended use of the coating materials. In particular, it is possible in this way to incorporate into the copolymers (A) functional groups by means of which the copolymers (A) become hydrophilic, so that they may be dissolved or dispersed in aqueous media. It is also possible to incorporate functional groups capable of entering into thermal crosslinking reactions with the complementary functional groups, described below, of any crosslinking agents used. It is also possible to attach functional groups which give the copolymer (A) selfcrosslinking properties, such as N-methylol or N-alkoxymethyl groups.

In accordance with the invention, very particular advantages result if the monomers (a) used comprise the monomers (a1) and (a2) and also, if desired, (a3).

In accordance with the invention, monomers (b) used comprise compounds of the general formula I.

In the general formula I, the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tert-butyl, amyl, hexyl or 2-ethylhexyl.

Examples of suitable cycloalkyl radicals are cyclobutyl, cyclopentyl or cyclohexyl.

Examples of suitable alkylcycloalkyl radicals are methylenecyclohexane, ethylenecyclohexane or propane-1, 3-diylcyclohexane.

Examples of suitable cycloalkylalkyl radicals are 2-, 3- or 4-methyl-, -ethyl-, -propyl- or -butylcyclohex-1-yl.

Examples of suitable aryl radicals are phenyl, naphthyl or biphenylyl, preferably phenyl and naphthyl, and especially phenyl.

Examples of suitable alkylaryl radicals are benzyl or ethylene- or propane-1,3-diylbenzene.

Examples of suitable cycloalkylaryl radicals are 2-, 3- or 4-phenylcyclohex-1-yl.

Examples of suitable arylalkyl radicals are 2-, 3- or 4-methyl-, -ethyl-, -propyl- or -butylphen-1-yl.

Examples of suitable arylcycloalkyl radicals are 2-, 3- or 4-cyclohexylphen-1-yl.

The above-described radicals $R^1$, $R^2$, $R^3$ and $R^4$ may be substituted. The substituents used may comprise electron-withdrawing or electron-donating atoms or organic radicals.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl and arylcycloalkyl radicals, including those exemplified above, especially tert-butyl, aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; hydroxyl groups; and/or primary, secondary and/or tertiary amino groups, especially amino, N-methylamino, N-ethylamino, N-propylamino, N-phenylamino, N-cyclohexylamino, N,N-dimethylamino, N,N-diethylamino, N,N-dipropylamino, N,N-diphenylamino, N,N,-dicyclohexylamino, N-cyclohexyl-N-methylamino and N-ethyl-N-methylamino.

Examples of monomers (b) whose use is particularly preferred in accordance with the invention are diphenylethylene, dinaphthaleneethylene, cis- or trans-stilbene, vinylidenebis(4-N,N-dimethylaminobenzene), vinylidenebis(4-aminobenzene), and vinylidene-bis(4-nitrobenzene).

In accordance with the invention, the monomers (b) may be used individually or as a mixture of at least two monomers (b).

In terms of the reaction regime and the properties of the resultant copolymers (A), especially the acrylate copolymers (A), diphenylethylene is of very particular advantage and is therefore used with very particular preference in accordance with the invention.

The monomers a) and b) to be used in accordance with the invention are reacted with one another to form the copolymer (A) in the presence of at least one free-radical initiator. Examples of initiators which can be used are: dialkyl peroxides, such as di-tert-butyl peroxide or dicumyl peroxide; hydroperoxides, such as cumene hydroperoxide or tert-butyl hydroperoxide; per esters, such as tert-butyl perbenzoate, tert-butyl perpivalate, tert-butyl per-3,5,5-trimethylhexanoate or tert-butyl per-2-ethylhexanoate; potassium, sodium or ammonium peroxodisulfate; azodinitriles such as azobisisobutyronitrile; C—C-cleaving initiators such as benzpinacol silyl ether; or a combination of a nonoxidizing initiator with hydrogen peroxide.

It is preferred to add comparatively large amounts of free-radical initiator, the proportion of the initiator in the reaction mixture being based in each case on the overall amount of the monomers (a) and of the initiator with particular preference from 0.5 to 50% by weight, with very particular preference from 1 to 20% by weight, and in particular from 2 to 15% by weight.

Preferably, the weight ratio of initiator to the monomers (b) is from 4:1 to 1:4, with particular preference from 3:1 to 1:3, and in particular from 2:1 to 1:2. Further advantages result if the initiator is used in an excess within the stated limits.

The free-radical copolymerization is preferably conducted in the apparatus mentioned at the outset, especially stirred vessels or Taylor reactors, the Taylor reactors being designed such that the conditions of Taylor flow are met over the entire reactor length, even if the kinematic viscosity of the reaction medium alters greatly, and in particular increases, owing to the copolymerization (cf. DE 198 28 742 A1).

In accordance with the invention, the copolymerization is conducted in an aqueous medium.

The aqueous medium comprises essentially water. The aqueous medium may include minor amounts of the below-detailed crosslinking agents, reactive diluents and/or coatings additives and/or other dissolved solid, liquid or gaseous organic and/or inorganic substances of low and/or high molecular mass, especially surface-active substances, provided these do not adversely affect, or even inhibit, the copolymerization. In the context of the present invention, a "minor amount" is an amount which does not remove the aqueous character of the aqueous medium.

Alternatively, the aqueous medium may comprise straight water.

The copolymerization is preferably conducted in the presence of at least one base. Particular preference is given to low molecular mass bases such as sodium hydroxide solution, potassium hydroxide solution, ammonia, diethanolamine, triethanolamine, mono-, di- and triethylamine, and/or dimethylethanolamine, especially ammonia and/or di- and/or triethanolamine.

The copolymerization is advantageously conducted at temperatures above room temperature and below the lowest decomposition temperature of the monomers used in each case, preference being given to a chosen temperature range of from 10 to 150° C., with very particular preference from 70 to 120° C., and in particular from 80 to 110° C.

When using particularly volatile monomers (a) and/or (b), the copolymerization may also be conducted under pressure, preferably under from 1.5 to 3000 bar, with particular preference from 5 to 1500 bar, and in particular from 10 to 1000 bar.

The free-radical polymerization is preferably conducted in emulsion, miniemulsion or microemulsion. For further details, reference is made to the patent applications and literature references DE 196 28 142 A1, DE 196 28 143 A1 or EP 0 401 565 A1, Emulsion Polymerization and Emulsion Polymers, Editors P. A. Lovell and Mohamed S. El-Aasser, John Wiley and Sons, Chichester, N.Y., Weinheim, 1997, pages 700 et sequence.; Mohamed S. El-Aasser, Advances in Emulsion Polymerization and Latex Technology, 30th Annual Short Course, Volume 3, Jun. 7–11, 1999, Emulsion Polymers Institute, Lehigh University, Bethlehem, Pa., USA.

In terms of the molecular weight distributions, there are no restrictions whatsoever imposed on the copolymer (A). Advantageously, however, the copolymerization is conducted so as to give a molecular weight distribution Mw/Mn, measured by gel permeation chromatography using polystyrene as standard, of $\leq 4$, with particular preference $\leq 2$, and in particular $\leq 1.5$, and in certain cases even $\leq 1.3$. The molecular weights of the constituents (A) may be controlled within wide limits by the choice of ratio of monomer (a) to monomer (b) to free radical initiator. In this context, the amount of monomer (b) in particular determines the molecular weight, specifically such that, the higher the proportion of monomer (b), the lower the resultant molecular weight.

The copolymer (A) is obtained as a mixture with the aqueous medium, generally in the form of a dispersion. In this form it can be processed further directly or else used as a macroinitiator for further reaction with at least one further monomer (a) in a second stage (ii). The copolymer (A)

resulting in the first stage (i), however, may also be isolated as a solid and then reacted further.

The further reaction in accordance with the stage (ii) is preferably conducted under the standard conditions for a free-radical polymerization, it being possible for suitable solvents and/or reactive diluents to be present. Stages (i) and (ii) in the context of the process of the invention may be conducted separately from one another, both spatially and temporally. In addition, however, stages (i) and (ii) may also be carried out in succession in one reactor. For this purpose, the monomer (b) is first reacted with at least one monomer (a), completely or partially depending on the desired application and the desired properties, after which at least one further monomer (a) is added and the mixture is subjected to free-radical polymerization. In another embodiment, at least two monomers (a) are used from the start, the monomer (b) being first reacted with one of the at least two monomers (a) and then the resultant reaction product (A) being reacted, above a certain molecular weight, with the further monomer (a) as well.

Depending on reaction regime, it is possible in accordance with the invention to prepare endgroup-functionalized copolymers, block, multiblock and gradient copolymers, star copolymers, graft copolymers, and branched copolymers (A).

The copolymer (A) may include at least one, preferably at least two, reactive functional groups which are able to enter into thermal crosslinking reactions with complementary reactive functional groups of the crosslinking agents described below that are used if desired. The functional groups may introduced into the copolymer (A) by way of the monomers (a) or may be introduced into the copolymer (A) following its synthesis, by means of polymer-analogous reactions.

Examples of suitable complementary reactive functional groups which enter into crosslinking reactions, for use in accordance with the invention, are summarized in the following overview. In the overview, the variable $R^5$ stands for substituted or unsubstituted alkyl, cycloalkyl, alkylcycloalkyl, cycloalkylalkyl, aryl, alkylaryl, cycloalkylaryl, arylalkyl or arylcycloalkyl radicals; the variables $R^6$ and $R^7$ stand for identical or different alkyl, cycloalkyl, alkylcycloalkyl or cycloalkylalkyl radicals, or are linked with one another to form an aliphatic or heteroaliphatic ring. Examples of suitable radicals of this kind are those listed above in connection with the radicals $R^1$, $R^2$, $R^3$ and $R^4$.

Overview: Examples of complementary functional groups in the Copolymer (A) and crosslinking agent or crosslinking agent and copolymer (A)

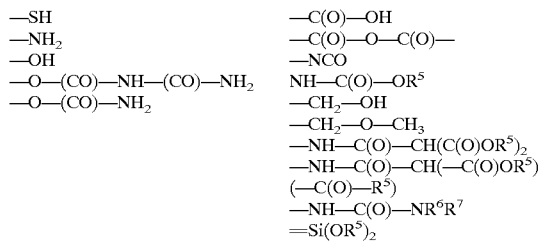

Overview: Examples of complementary functional groups in the Copolymer (A) and crosslinking agent or crosslinking agent and copolymer (A)

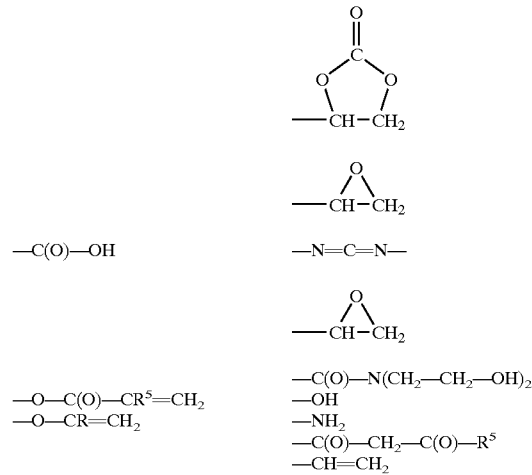

The selection of the respective complementary groups is guided on the one hand by the consideration that, during storage, they should not enter into any unwanted reactions and/or should not disrupt or inhibit curing, if appropriate, with actinic radiation, and on the other hand by the temperature range within which thermal curing is to take place.

In this context, especially in regard to heat-sensitive substrates such as plastics, it is of advantage in accordance with the invention to choose a temperature range which does not exceed 100° C., and in particular does not exceed 80° C. In the light of these boundary conditions, complementary functional groups which have proven advantageous are hydroxyl groups and isocyanate groups, or carboxyl groups and epoxy groups, which are therefore employed with preference, in accordance with the invention, in the coated materials of the invention that are present as two-component or multi-component systems. Particular advantages result if the hydroxyl groups are used as functional groups and the isocyanate groups as functional groups.

If higher crosslinking temperatures, for example, from 100° C. to 160° C., may be employed, which is preferred in accordance with the invention, suitable coating materials also include one-component systems, in which the reactive functional groups of the copolymer (A) are preferably thio, amino, hydroxyl, carbamate, allophanate, carboxyl and/or (meth)acrylate groups, but especially hydroxyl groups, and functional groups of the crosslinking agent are preferably anhydride, carboxyl, epoxy, blocked isocyanate, urethane, methylol, methylol ether, siloxane, amino, hydroxyl and/or beta-hydroxyalkylamide groups.

Alternatively, the copolymer (A) and the coating material prepared with it may film without a crosslinking agent and may form an excellent deformable color and/or effect coating. In this case, the copolymer (A) is physically curing. In the context of the present invention, the physical curing and the thermal external crosslinking or selfcrosslinking by way of the above-described complementary groups are subsumed under the generic term "thermal curing".

The dispersion of the copolymer (A) may be used directly to prepare the coating materials (A) of the invention. However, in many cases it may be of advantage to obtain the copolymer (A) from the dispersion, by freeze drying, for example, and to store it until the point where the coating material of the invention is prepared. This has the advantage that the freeze-dried solid copolymer (A) is comparatively stable toward microbial degradation.

The proportion of the copolymer (A) for use in accordance with the invention in the coating material may vary very widely. In the light of the pigment/binder or pigment+filler/binder ratio (B) to (A) that is to be established in accordance with the invention, namely from 10:1 to 1:300, preferably from 9:1 to 1:280, more preferably from 8:1 to 1:260, with particular preference from 7:1 to 1:240, with very particular preference from 6:1 to 1:220, and in particular from 5:1 to 1:200, the proportion is preferably from 0.33 to 91, more preferably from 0.35 to 90, with particular preference from 0.38 to 88.8, with very particular preference from 0.41 to 87.5, in particular from 0.45 to 85.7, and especially from 0.5 to 83.4, based in each case on the solids content of the coating material of the invention.

The coating material of the invention may further comprise at least one conventional binder with at least one reactive functional group. This conventional binder differs materially from the copolymer (A). Examples of suitable conventional binders are linear and/or branched and/or block, comb and/or random poly(meth)acrylates or acrylate copolymers, polyesters, alkyds, amino resins, polyurethanes, acrylated polyurethanes, acrylated polyesters, polylactones, polycarbonates, polyethers, epoxy resin-amine adducts, (meth)acrylate diols, partially hydrolyzed polyvinyl esters or polyureas, which contain said reactive functional groups. If used, their proportion in the coating material of the invention may vary very widely, the optimum proportion being a function of the requirements of the individual case.

The coating material of the invention comprises at least one color and/or effect pigment, in particular at least one effect pigment (B).

Regarding the term effect pigments, reference is made to Römpp Lexikon Lacke und Druckfarben, Georg Thieme Verlag, 1998, pages 176, "Effect pigments", and 380 and 381, "Metal oxide-mica pigments" to "Metal pigments".

Accordingly, suitable effect pigments (B) include metal flake pigments such as commercial aluminum bronzes, aluminum bronzes chromated in accordance with DE-A-36 36 183, commercial stainless steel bronzes, and metal and nonmetal effect pigments, such as pearlescent pigments and interference pigments, for example. Particular preference is given to using metal effect pigments, especially aluminum effect pigments.

The effect pigment (B) may have a broad or a narrow particle size distribution.

The determination is carried out by the laser diffraction method (cf. Römpp Lexikon Lacke und Druckfarben, Georg Thieme Verlag, 1998, page 349, "Laser diffraction"), by sieve analysis (cf. Römpp Lexikon Lacke und Druckfarben, Georg Thieme Verlag, 1998, page 521, "Sieve analysis") in accordance with DIN 66165-1 or -2: 1987–04 or DIN 66160:1990–02, by sedimentation analysis in accordance with DIN 66115-2: 1983–02 with the aid of the pipette process or of the sedigraph, or by screen analysis in accordance with DIN 66118:1984–04 (cf. Römpp Lexikon Lacke und Druckfarben, Georg Thieme Verlag, 1998, page 521, "Screen analysis").

In the context of the present invention, the term "broad particle size distribution" indicates that the effect pigment (B) in question has a comparatively large fine fraction, i.e., pigment particles with a size in the range from 1 to 10 $\mu$m, and a comparatively large coarse fraction with a size in the range from 70 to 90 $\mu$m. This results in a particularly flat slope of the cumulative particle distribution curve.

The effect pigments (B) may also be leafing effect pigments with a broad or narrow particle size distribution. Leafing pigments are pigments which float in films of pigmented coating materials. In accordance with DIN 55945 (12/1988), this refers to the accumulation of pigments at the surface of a coating material (cf. Römpp Lexikon Lacke und Druckfarben, Georg Thieme Verlag, 1998, page 351, "Leafing pigments").

Furthermore, they may be coated with optically transparent, thermoplastic oligomers and polymers. Oligomers are resins containing at least 2 to 15 monomer units in their molecule. Polymers are resins containing at least 10 monomer units in their molecule. For further details of these terms, reference is made to Römpp Lexikon Lacke und Druckfarben, Georg Thieme Verlag, Stuttgart, N.Y., 1998, "Oligomers", page 425.

Examples of suitable oligomers and polymers are linear and/or branched and/or block, comb and/or random polyaddition resins, polycondensation resins and/or addition (co)polymers of ethylenically unsaturated monomers.

Examples of suitable addition (co)polymers are (meth)acrylate (co)polymers and/or polystyrene, polyvinyl esters, polyvinyl ethers, polyvinyl halides, polyvinyl amides, polyacrylonitriles, polyethylenes, polypropylenes, polybutylenes, polyisoprenes and/or copolymers thereof.

Examples of suitable polyaddition resins or polycondensation resins are polyesters, alkyds, polylactones, polycarbonates, polyethers, epoxy resin-amine adducts, polyurethanes and/or polyureas.

Furthermore, the effect pigments (B) may have been hydrophilicized. This is preferably carried out by pasting with a nonionic surfactant (cf. Römpp Lexikon Lacke und Druckfarben, Georg Thieme Verlag, 1998, page 410, "Nonionic surfactants").

The color pigments (B) may comprise organic or inorganic compounds. Because of this large number of suitable color pigments (B), therefore, the coating materials of the invention ensure universality in their breadth of use and enable the realization of a large number of particularly attractive color shades and optical effects.

Examples of suitable inorganic color pigments (B) are titanium dioxide, iron oxides, and carbon black. Examples of suitable organic color pigments (B) are thioindigo pigments, indanthrene blue, Irgalith blue, Heliogen blue, Irgazine blue, Palomar blue, Cromophthal red, Hostaperm pink, Irgazine orange, Sicotrans yellow, Sicotan yellow, Hostaperm yellow, Paliotan yellow, and Heliogen green.

For further details, reference is made to Römpp Lexikon Lacke und Druckfarben, Georg Thieme Verlag, 1998, pages 180 and 181, "Iron blue pigments" to "Black iron oxide", pages 451 to 453, "Pigments" to "Pigment volume concentration", page 563, "Thioindigo pigments", and page 567, "Titanium dioxide pigments".

The amount of the pigments (B) for use in accordance with the invention in the coating materials of the invention may vary very widely. It is guided preferably by the above-indicated pigment/binder or pigment+filler/binder ratio (B) to (A) that is to be established in accordance with the invention. The amount is preferably from 9 to 99.67, more preferably from 10 to 99.65, with particular preference from 11.2 to 99.62, with very particular preference from 12.5 to 99.59, in particular from 14.3 to 99.55, and especially from 16.6 to 99.5% by weight, based in each case on the solids of the coating material of the invention.

The coating material of the invention may further comprise at least one filler.

Examples of suitable organic and inorganic fillers are chalk, calcium sulfates, barium sulfate, silicates such as talc or kaolin, silicas, oxides such as aluminum hydroxide or magnesium hydroxide, or organic fillers such as textile fibers, cellulose fibers, polyethylene fibers, polyacrylonitrile powders, polyamide powders, or wood flour. For further details, reference is made to Römpp Lexikon Lacke und Druckfarben, Georg Thieme Verlag, 1998, pages 250 ff., "Fillers". Further examples of suitable fillers are known from German Patent Application DE 196 06 706 A1, column 8, lines 30 to 64. They are preferably used in the amounts specified therein, preferably taking account of the above-indicated pigment+filler/binder ratio for use in accordance with the invention.

The pigments (B) and fillers may also be present in an ultrafine, nonhiding form. Furthermore, they may be incorporated into the coating materials by way of pigment pastes, suitable grinding resins being, in particular, the copolymers (A) described above.

The coating materials of the invention may further comprise at least one crosslinking agent which comprises at least two, preferably at least three, reactive functional groups which are able to react with the complementary reactive functional groups in the copolymers (A).

Examples of suitable crosslinking agents are the following:

tris(alkoxycarbonylamino)triazines (TACT), as described in the patents and patent applications U.S. Pat. Nos. 4,939,213 A, 5,084,541 A and EP 0 604 922 A1 or EP 0 624 577 A1;

amino resins, as described, for example, in Römpp Lexikon Lacke und Druckfarben, Georg Thieme Verlag, 1998, page 29, "amino resins", in the textbook "Lack-additive" [Coatings additives] by Johan Bieleman, Wiley-VCH, Weinheim, N.Y., 1998, pages 242 ff., in the book "Paints, Coatings and Solvents", second, completely revised edition, edited by D. Stoye and W. Freitag, Wiley-VCH, Weinheim, N.Y., 1998, pages 80 ff., in the patents U.S. Pat. No. 4,710,542 A1 or EP 0 245 700 A1, and in the article by B. Singh and coworkers, "Carbamylmethylated Melamines, Novel Crosslinkers for the Coatings Industry", in Advanced Organic Coatings Science and Technology Series, 1991, volume 13, pages 193 to 207, carboxyl-containing compounds or resins, as described for example in the patent DE 196 52 813 A1 or 198 41 408 A1, especially dodecanedoic acid, compounds or resins containing epoxide groups, as described for example in the patents EP 0 299 420 A1, DE 22 14 650 B1, DE 27 49 576 B1, U.S. Pat. No. 4,091,048 A1 or 3,781,379 A1, blocked and non-blocked polyisocyanates, as described for example in the patents U.S. Pat. No. 4,444,954 A1, DE 196 17 086 A1, DE 196 31 269 A1, EP 0 004 571 A1 or EP 0 582 051 A1, and/or beta-hydroxyalkylamides such as N,N,N',N'-tetra-kis(2-hydroxyethyl)adipamide or N,N,N',N'-tetra-kis(2-hydroxypropyl)adipamide.

Their selection is guided by the consideration as to whether the coating material of the invention in question is to be a one-component system or a two-component or multicomponent system. In the case of two-component or multicomponent systems, use is made in particular of non-blocked polyisocyanates, which until the time of their use are stored separately from the other constituents of the coating material of the invention.

Insofar as they are used, they are present in the coating material of the invention in conventional amounts, as specified in the abovementioned patents and patent applications.

If the coating material of the invention is to be curable not only thermally but also with actinic radiation, especially UV radiation and/or electron beams (dual cure), it includes at least one constituent which can be activated with actinic radiation.

Activatable constituents include in principle all oligomeric and polymeric compounds capable of being cured with actinic radiation, especially UV radiation and/or electron beams, as are commonly used in the field of UV-curable or electron beam-curable coating materials.

Advantageously, radiation-curable binders are used as activatable constituents. Examples of suitable radiation-curable binders are (meth)acrylic-functional (meth)acrylic copolymers, polyether acrylates, polyester acrylates, unsaturated polyesters, epoxy acrylates, urethane acrylates, amino acrylates, melamine acrylates, silicone acrylates, isocyanato acrylates, and the corresponding methacrylates. It is preferred to use binders which are free from aromatic structural units. Preference is therefore given to the use of urethane (meth)acrylates and/or polyester (meth)acrylates, particular preference to the use of aliphatic urethane acrylates.

The coating material of the invention may further comprise customary and known additives, or print additives, in effective amounts. The essential factor is that they do not inhibit or completely prevent the crosslinking reactions.

Examples of suitable additives are reactive diluents curable thermally and/or with actinic radiation, low-boiling organic solvents and high-boiling organic solvents ("long solvents"), UV absorbers, light stabilizers, free-radical scavengers, thermally unstable free-radical initiators, photoinitiators and photocoinitiators, catalysts for thermal crosslinking, devolatilizers, slip additives, polymerization inhibitors, defoamers, emulsifiers, wetting agents and dispersants, adhesion promoters, flow control agents, film-forming auxiliaries, rheology control additives (thickeners), flame retardants, siccatives, dryers, antiskinning agents, corrosion inhibitors, waxes, flatting agents, or precursors of organically modified ceramic materials.

Positionally isomeric diethyloctanediols or hydroxyl-containing hyperbranched compounds or dendrimers, as described in the Patent Applications DE 198 09 643 A1, DE 198 40 605 A1 or DE 198 05 421 A1 are examples of suitable thermally curable reactive diluents.

Examples of suitable reactive diluents curable with actinic radiation are those described in Römpp Lexikon Lacke und Druckfarben, Georg Thieme Verlag, Stuttgart, N.Y., 1998, on page 491 under the keyword "Reactive diluents".

Examples of suitable low-boiling organic solvents (D) and high-boiling organic solvents ("long solvents") are ketones such as methyl ethyl ketone or methyl isobutyl ketone, diols such as butyl glycol, esters such as ethyl acetate, butyl acetate or butyl glycol acetate, ethers such as dibutyl ether or ethylene glycol, diethylene glycol, propylene glycol, dipropylene glycol, butylene glycol or dibutylene glycol dimethyl, diethyl or dibutyl ether, N-methylpyrrolidone or xylenes, or mixtures of aromatic hydrocarbons such as Solventnaphtha® or Solvesso®.

Examples of suitable thermally unstable free-radical initiators are organic peroxides, organic azo compounds, or C—C-cleaving initiators such as dialkyl peroxides, peroxo-carboxylic acids, peroxodicarbonates, peroxide esters, hydroperoxides, ketone peroxides, azodinitriles or benzpinacol silyl ether.

Examples of suitable catalysts for the crosslinking are dibutyltin dilaurate, lithium decanoate or zinc octoate.

Examples of suitable photoinitiators and coinitiators are described in Römpp Lexikon Lacke und Druckfarben, Georg Thieme Verlag, Stuttgart, 1998, pages 444 to 446.

Examples of suitable devolatilizers are diazadicycloundecane or benzoin.

Examples of suitable emulsifiers are nonionic emulsifiers, such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols.

Examples of suitable wetting agents are siloxanes, compounds containing fluorine, carboxylic monoesters, phosphoric esters, polyacrylic acids and copolymers thereof, or polyurethanes.

An example of a suitable adhesion promoter is tricyclodecanedimethanol.

Examples of suitable film-forming auxiliaries are cellulose derivatives such as cellulose acetobutyrate (CAB).

Examples of suitable rheology control additives are those known from the patents WO 94/22968, EP 0 276 501 A1, EP 0 249 201 A1 or WO 97/12945; crosslinked polymeric microparticles, as disclosed for example in EP 0 008 127 A1; inorganic phyllosilicates such as aluminum-magnesium silicates, sodium-magnesium phyllosilicates and sodium-magnesium-fluorine-lithium phyllosilicates of the montmorillonite type; silicas such as Aerosils, or synthetic polymers having ionic and/or associative groups, such as polyvinyl alcohol, poly(meth)acrylamide, poly(meth)acrylic acid, polyvinylpyrrolidone, styrene-maleic anhydride or ethylene-maleic anhydride copolymers and their derivatives, or hydrophobically modified ethoxylated urethanes or polyacrylates.

An example of a suitable flatting agent is magnesium stearate.

Examples of suitable precursors of organically modified ceramic materials are hydrolyzable organometallic compounds, especially of silicon and aluminum.

Further examples of the additives recited above, and examples of suitable UV absorbers, free-radical scavengers, flow control agents, flame retardants, siccatives, dryers, antiskinning agents, corrosion inhibitors and waxes, are described in detail in the textbook "Lackadditive" [Coatings additives] by Johan Bieleman, Wiley-VCH, Weinheim, N.Y., 1998.

In terms of method, the preparation of the coating material of the invention has no particular features but instead takes place with the aid of the conventional apparatus and processes for preparing aqueous coating materials, using conventional mixing equipment such as stirred vessels, dissolvers, including in-line dissolvers, toothed-wheel dispersers, stirred mills, or extruders.

The coating material of the invention provides coatings of the invention which are deformable without problems. This means that the coatings are not destroyed or damaged under shaping mechanical load. The coating material of the invention may therefore be processed with advantage into visually outstanding color and/or effect dry-paint films whose excellent deformability allows them to be laminated with great ease onto three-dimensional articles. They may also be laminated onto deformable substrates. The laminates of the invention which result in this case are then, again, shaped.

Suitable deformable substrates comprise preferably metal, plastics, textiles or leather, or composites of these materials.

In accordance with the coating process of the invention, the dry-paint films are prepared by applying the coating material of the invention to at least one side of a strip comprising the above-mentioned materials, and curing the resultant coat. Subsequently, the resultant dry-paint films may be removed from the strip and processed further, as described above, into the laminates of the invention.

In the coating process of the invention, the coatings of the invention may alternatively remain on the strip so resulting directly, by strip coating (coil coating), in the laminate of the invention.

It is an essential advantage of the coating process of the invention that it can be used to process not only coating materials of the invention but also coating materials which comprise copolymers (A) but do not have the above-specified pigment/binder or pigment+filler/binder ratio (B) to (A). Preferably, however, it is the coating materials of the invention that are processed by the coating process of the invention.

One particularly preferred embodiment of the coating process of the invention starts from a metal strip which has been conventionally cleaned, degreased, passivated, chemically treated, rinsed and dried, and also, if desired, has been provided on one or two sides with at least one coating film or primer or with at least one single-coat or multicoat coating system.

Suitable metals are all those from which strips may be shaped which are up to the mechanical, chemical and thermal stresses of coil coating. Highly suitable metal strips are those based on aluminum or iron. In the case of iron, cold-rolled steels, electrolytically zinc-plated steels, hot-dip galvanized steels, or stainless steels are particularly suitable. The strips are preferably of a thickness of from 200 µm to 2 mm.

For coil coating, the metal strip passes through a coil coating line as described, for example, in Römpp Lexikon Lacke und Druckfarben, Georg Thieme Verlag, Stuttgart, N.Y., 1998, page 55, "Coil coating", or in German Patent Application DE 196 32 426 A1, at a speed adapted to the application properties and curing properties of the coating materials of the invention employed in the coating process of the invention. The speed may therefore vary very widely from one coating process to the next. It is preferably from 10 to 150, more preferably from 12 to 120, with particular preference from 14 to 100, with very particular preference from 16 to 80, and in particular from 20 to 70 m/min.

The coating materials of the invention, and the other coating materials, if used, may be applied in any desired manner; for example, by spraying, flow coating or roller coating. Of these application techniques, roller coating is particularly advantageous and is therefore used with preference in accordance with the invention.

Each application step of roller coating may be carried out with two or more rolls. It is preferred to employ from two to four, and especially two, rolls.

In the case of roller coating, the rotating pick-up roll dips into a stock reservoir and so picks up the coating material of the invention that is to be applied. This coating material is transferred from the pick-up roll directly, or via at least one transfer roll, to the rotating application roll. From this latter roll, the coating material of the invention is transferred to the strip by means of co-directional or counter-directional contact transfer.

The coating material of the invention may alternatively be pumped directly into a nib between two rolls, which is referred to in the art, inter alia, as NIP feed.

In accordance with the invention, the counter-directional contact transfer or reverse roller coating technique is of advantage and is therefore employed with preference.

In the case of roller coating, the peripheral speeds of the pick-up roll and of the application roll may vary very greatly from one coating process to the next. The application roll preferably has a peripheral speed which is from 110 to 125% of the strip speed, and the pick-up roll has a peripheral speed which is from 20 to 40% of the strip speed.

The coating materials of the invention are preferably applied in a wet film thickness such as to give, after the curing of the applied films, coatings of the invention having a dry film thickness of from 5 to 100, preferably from 6 to 80, with particular preference from 8 to 70, with very particular preference from 10 to 60, and in particular from 12 to 50 µm.

The application methods described above may be employed for any other coating materials used, unless they are powder coating materials, in which case the application methods described in German Patent Application DE 196 32 426 A1 must be used.

Examples of suitable other coating materials are conventional pigmented and nonpigmented coating materials such as primers based on polyester and/or epoxy, electrodeposition coating materials, surfacers, and/or clearcoat materials.

Examples of suitable electrodeposition coating materials and, where appropriate, of wet-on-wet techniques are described in Japanese Patent Application 1975-142501 (Japanese laid-open specification JP 52-065534 A2, Chemical Abstracts No. 87: 137427) or in the patents and patent applications U.S. Pat. Nos. 4,375,498 A, 4,537,926 A, 4,761,212 A, EP 0 529,335 A1, DE 41 25 459 A1, EP 0 595 186 A1, EP 0 074 634 A1, EP 0 505 445 A1, DE 42 35 778 A1, EP 0 646 420 A1, EP 0 639 660 A1, EP 0 817 648 A1, DE 195 12 017 C1, EP 0 192 113 A2, DE 41 26 476 A1 or WO 98/07794.

Examples of suitable surfacers are known from the patent applications and patents EP 0 427 028 B1, DE 41 42 816 C1, DE 38 05 629 C1, DE 31 08 861 C2 or DE 195 04 947 A1.

Suitable clearcoat materials are all one-component or multicomponent clearcoat materials, powder clearcoat materials, powder slurry clearcoat materials, UV-curable clearcoat materials, or sealers that are known per se, as known from the patent applications, patents and publications DE 42 04 518 A1, EP 0 594 068 A1, EP 0 594 071 A1, EP 0 594 142 A1, EP 0 604 992 A1, EP 0 596 460 A1, WO 94/10211, WO 94/10212, WO 94/10213, WO 94/22969 or WO 92/22615, U.S. Pat. No. 5,474,811 A1, 5,356,669 A1 or 5,605,965 A1, DE 42 22 194 A1 in the product information bulletin from BASF Lacke+Farben AG, "Pulverlacke" [Powder coatings], 1990, in the BASF Coatings AG brochure "Pulverlacke, Pulverlacke für industrielle Anwendungen" [Powder coating materials, powder coatings for industrial applications], January 2000, U.S. Pat. No. 4,268,542 A1, DE 195 40 977 A1, DE 195 18 392 A1, DE 196 17 086 A1, DE-A-196 13 547, DE 196 52 813 A1, DE-A-198 14 471 A1, EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1, EP 0 002 866 A1, DE 197 09 467 A1, DE 42 03 278 A1, DE 33 16 593 A1, DE 38 36 370 A1, DE 24 36 186 A1, DE 20 03 579 B1, WO 97/46549, WO 99/14254, U.S. Pat. Nos. 5,824,373 A, 4,675,234 A, 4,634,602 A, 4,424,252 A, 4,208,313 A, 4,163,810 A, 4,129,488 A, 4,064,161 A, 3,974,303 A, EP 0 844 286 A1, DE 43 03 570 A1, DE 34 07 087 A1, DE 40 11 045 A1, DE 40 25 215 A1, DE 38 28 098 A1, DE 40 20 316 A1 or DE 41 22 743 A1.

Examples of coatings produced from these materials are primer coats, electrodeposition coats, surfacer coats, and clearcoats.

In the context of the coating process of the invention, preference is given to a procedure in which at least one coating material of the invention (i) is applied directly to the strip and cured, to give at least one coating of the invention, (ii) is applied to at least one single-coat or multicoat coating system present on the strip, and is cured, to give likewise at least one coating of the invention, or (iii) is applied wet-on-wet to at least one single-coat or multicoat coating film present on the strip, and the coating film(s) is (are) cured together, to give likewise at least one coating of the invention.

Alternatively, (iv) the cured or uncured film(s) may be coated with at least one coating material, after which the resultant coating film(s) is (are) cured alone or together with the film(s), to give likewise at least one coating of the invention.

The resultant coating of the invention may remain on the strip, so resulting directly in the laminate of the invention.

Alternatively—as already mentioned—the coating of the invention may also be removed from the strip, so giving the dry-paint films of the invention. Their removability may be ensured by means of appropriate, conventional anti-adhesion coats on the strip.

The thermal curing is preferably realized by means of a preset temperature program adapted to the drying rate, the melting range and, if appropriate, the temperature range of curing of the coating materials of the invention that are used in each case. These parameters in turn are dependant primarily on the material composition of the respective coating materials of the invention. The temperature program may therefore vary very widely from one coating material of the invention to the next, but is easy for the skilled worker to derive on the basis of the known relationships between material composition and the abovementioned parameters.

Heating may take place by means of convection, exposure to near or far infrared, and/or, in the case of strips based on iron, by means of electrical induction. The maximum object temperature is preferably 250° C.

The heating time, i.e., the duration of thermal curing, varies depending on the coating material of the invention that is used. It is preferably from 10 seconds to 2 minutes.

If essentially convection is employed, then at the preferred belt running speeds this requires convection ovens with a length of from 30 to 50 m, in particular from 35 to 45 m.

The thermal curing of the coating materials of the invention may also be assisted by exposure to actinic radiation.

Alternatively, curing may take place with actinic radiation alone, as described, for example, in German Patent Application DE 198 35 206 A1.

In the context of the present invention, actinic radiation is electromagnetic radiation, such as near infrared (NIR), visible light, UV radiation or X-rays, especially UV radiation, and corpuscular radiation such as electron beams.

Where thermal curing and curing with actinic light are used together for a coating material of the invention, the terms used include "dual cure" and "dual-cure coating material".

In the case of curing with actinic radiation it is preferred to employ a dose of from 1000 to 3000, preferably from 1100 to 2900, with particular preference from 1200 to 2800, with very particular preference from 1300 to 2700, and in particular from 1400 to 2600 mJ/cm$^2$. If desired, this curing may be supplemented with actinic radiation from other sources. In the case of electron beams, it is preferred to operate under an inert gas atmosphere. This may be ensured, for example, by supplying carbon dioxide and/or nitrogen directly to the surface of the applied film of the coating material of the invention. In the case of curing with UV radiation as well it is possible to operate under inert gas in order to avoid the formation of ozone.

Curing with actinic radiation is carried out using the conventional radiation sources and optical auxiliary measures. Examples of suitable radiation sources are flash lamps from the company VISIT, high-pressure or low-pressure mercury vapor lamps, with or without lead doping in order to open up a radiation window of up to 405 nm, or electron beam sources. The arrangement of these sources is known in principle and may be adapted to the circumstances of the workpiece and the process parameters.

The curing methods described above may of course also be employed for the abovementioned other coating films.

If two or more coating materials are applied in the context of the process of the invention, this process is carried out in an appropriately designed installation comprising two or more application and, if appropriate, curing stations in series. Alternatively, following the application and curing of the first coating material, the coated strip is wound up again, after which the coated coil is provided in a second, third, etc. coil coating line with second, third, etc. coatings.

Following the production of the coated strips by the process of the invention, they may be wound up into coated coils and then processed further at another location; alternatively, they can be processed further directly as they come from coil coating. For instance, they may be laminated with plastics or provided with removable protective films. They may be shaped following their division into parts of appropriate size. Examples of suitable shaping methods include pressing and deep-drawing.

The resultant laminates of the invention and the shaped parts of the invention that are produced therefrom are scratch-resistant, corrosion-stable, weathering-stable and chemically stable, and exhibit an outstanding overall appearance, especially as regards gloss, color, dichroic effects, and metallic effects. They are therefore highly suitable for applications in automaking, for example, for the production of bodywork parts and bodies, truck bodies and trailer paneling, in the domestic appliance sector, for example, for the production of washing machines, dishwashers, dryers, refrigerators, freezers or ovens, in the lighting sector for the production of lamps for the interior and exterior, or in the interior and exterior architectural sector, for example, for the production of ceiling and wall elements, doors, gates, pipe insulation, shutters, or window profiles.

EXAMPLES

Preparation Example 1
The Preparation of a Dispersion of a Copolymer (A)

A steel reactor as conventionally used for preparing dispersions, equipped with a stirrer, a reflux condenser and 3 feed vessels, was charged with 52.563 parts by weight of DI water, and this initial charge was heated to 80° C. The first feed vessel was charged with 10.182 parts by weight of acrylic acid, 18.345 parts by weight of methyl methacrylate and 1.493 parts by weight of diphenylethylene. The second feed vessel was charged with 9.914 parts by weight of 25 percent strength ammonia solution. The third feed vessel was charged with 5.25 parts by weight of DI water and 2.253 parts by weight of ammonium peroxodisulfate. With intense stirring of the initial charge in the steel reactor, the three feed streams were commenced simultaneously. The first and second feed streams were metered in over the course of one hour. The third feed stream was metered in over the course of 1.25 hours. The resultant reaction mixture was held at 80° C. for four hours and then cooled to below 40° C. and filtered through a 100 μm GAF bag. The resultant dispersion had a solids content of from 32 to 34% by weight (1 hour, 130° C.) and a free monomer content of less than 0.2% by weight (as determined by gas chromatography).

The dispersion (A) was used to prepare a block copolymer (A).

Preparation Example 2
The Preparation of a Dispersion of a Block Copolymer (A)

A steel reactor as conventionally used to prepare dispersions, equipped with a stirrer, a reflux condenser and a feed vessel, was charged with 51.617 parts by weight of DI water and 9.907 parts by weight of the dispersion of Preparation Example 1, and this initial charge was heated with stirring to 80° C. Subsequently, a mixture of 9.856 parts by weight of n-butyl methacrylate, 7.884 parts by weight of stryene, 12.661 parts by weight of hydroxyethyl methacrylate and 8.885 parts by weight of ethylhexyl methacrylate were metered from the feed vessel over the course of six hours. The resultant reaction mixture was stirred at 80° C. for 2 hours. The resultant dispersion was then cooled to below 40° C. and filtered through a 50 μm GAF bag. The dispersion (A) had a solids content of from 41 to 42% by weight (1 hour, 130° C.) and a free monomer content of less than 0.2% by weight (as determined by gas chromatography).

Example 1
The Preparation of a Coating Material of the Invention 100 parts by weight of the dispersion (A) from Preparation Example 2 were admixed with 10 parts by weight of a commercial aluminum effect pigment (Stapa Hydrolux from Eckart) and 1 part by weight of Additol® XW395 (commercial wetting agent). The coating material of the invention was adjusted with water to a spray viscosity of 55 mPas.

Example 2
The Coating of an Aluminum Strip with the Coating Material of the Invention from Example 1

In a conventional coil coating line, a cleaned and degreased aluminum strip with a thickness of 500 μm, which had been provided on both sides with an oxide layer produced by anodic oxidation and passivated with phosphoric acid, was coated on one side at a strip speed of 45 m/min with the coating material of the invention from Example 1.

For this purpose, the coating material from a reservoir trough was picked up by a pick-up roll which rotated with a peripheral speed of 13.5 m/min. The coating material was transferred to the application roll at a narrow roll nip. The application roll rotated with a peripheral speed of 52 m/min and transferred the coating material counter-directionally onto the aluminum strip. The wet film thickness of the resultant basecoat film of the invention was chosen so as to give a dry film thickness after curing of 12 μm.

The strip coated with the basecoat film was passed to a convection oven with a length of approximately 40 m, in which the strip was heated in accordance with a temperature program to a strip temperature of up to a maximum of 250° C., so that the basecoat film cured. The total curing procedure lasted just under 1 min.

The effect basecoat of the invention, produced by the procedure of the invention, was smooth and glossy and exhibited an outstanding metallic effect. It withstood more than 100 double strokes with a cotton pad soaked with methyl ethyl ketone without suffering damage. The flexural strength (cf. Römpp Lexikon Lacke und Druckfarben, Georg Thieme Verlag, 1998, page 73, "flexural strength") and the bond strength were very good (T-bend test T0; tape test: T0). The cupping test (cold and thermal deformation) indicated good deformability.

The aluminum strip coated with the effect basecoat of the invention could be shaped without problems by deep-drawing to give shaped parts such as window frames, lamp parts, or automotive bodywork parts.

We claim:

1. A method of making coated substrates, comprising applying a composition to a substrate, wherein the composition comprises a copolymer (A) prepared by free-radical polymerization of
    a) at least one olefinically unsaturated monomer, and
    b) at least one olefinically unsaturated monomer different than the olefinically unsaturated monomer (a), of the general formula I

$$R^1R^2C=CR^3R^4 \qquad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals;
in an aqueous medium.

2. An aqueous color and/or effect coating material, comprising
    A) as binder, at least one copolymer prepared by free-radical polymerization of
        a) at least one olefinically unsaturated monomer, and
        b) at least one olefinically unsaturated monomer different than the olefinically unsaturated monomer (a), of the general formula I

$$R^1R^2C=CR^3R^4 \qquad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals;
in an aqueous medium; and
    B) at least one color and/or effect pigment in an amount such as to give a pigment/binder or pigment plus filler/binder ratio of (B) to (A) of 10:1 to 1:300.

3. A coil coating process comprising
applying at least one coating material continuously to at least one side of a coil, and
curing the applied coating material,
wherein at least one of the coating materials is an aqueous color and/or effect coating materiel comprising
    A) as binder, at least one copolymer prepared by free-radical polymerization of
        a) at least one olefinically unsaturated monomer, and
        b) at least one olefinically unsaturated monomer different than the olefinically unsaturated monomer (a), of the general formula I

$$R^1R^2C=CR^3R^4 \qquad (I)$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals in an aqueous medium.

4. The coating material of claim 2, wherein the copolymer (A) is obtained by
    (i) subjecting at least one monomer (a) and at least one monomer (b) to free-radical polymerization in an aqueous medium, after which
    (ii) the resultant reaction product is reacted under free-radical conditions with at least one further monomer (a).

5. The coating material of claim 4, wherein the free-radical polymerization is conducted in a process selected from the group consisting of emulsion, miniemulsion or microemulsion.

6. The coating material of claim 2, wherein the aryl radicals $R^1$, $R^2$, $R^3$ and/or $R^4$ of the compound (b) comprise phenyl or naphthyl radicals.

7. The coating material of claim 6, wherein the substituents in the radicals $R^1$, $R^2$, $R^3$ and/or $R^4$ of the compound (b) are electron withdrawing or electron donating atoms or organic radicals.

8. The coating material of claim 2, wherein monomer (a) is selected from the group consisting of
    a1) essentially acid-group-free (meth)acrylic esters;
    a2) monomers which carry per molecule at least one hydroxyl group, amino group, alkoxymethylamino group or imino group and are essentially free from acid groups;
    a3) monomers which carry per molecule at least one acid group which may be converted to the corresponding acid anion group;
    a4) vinyl esters of alpha-branched monocarboxylic acids having 5 to 18 carbon atoms in the molecule;
    a5) reaction products of acrylic acid and/or methacrylic acid with the glycidyl ester of an alpha-branched monocarboxylic acid having 5 to 18 carbon atoms per molecule;
    a6) cyclic and/or acyclic olefins;
    a7) (meth)acrylamides;
    a8) monomers containing epoxide groups;
    a9) vinylaromatic hydrocarbons;
    a10) nitriles;
    a11) vinyl compounds, especially vinyl halides and/or vinylidene dihalides, N-vinylpyrrolidone, vinyl ethers and/or vinyl esters;
    a12) allyl compounds, especially allyl ethers and allyl esters;
    a13) polysiloxane macromonomers having a number-average molecular weight Mn of from 1000 to 40,000 and having on average from 0.5 to 2.5 ethylenically unsaturated double bonds per molecule; and/or
    a14) acryloxysilane-containing vinyl monomers, preparable by reacting hydroxy-functional silanes with epichlorohydrin and then reacting the reaction product with (meth)acrylic acid and/or with hydroxyalkyl and/or hydroxycycloalkyl esters of (meth)acrylic acid (monomers a2).

9. The process of claim 3, wherein the applied coating material is heated at up to 250° C.

10. The process of claim 9, wherein the heated applied coating material is exposed to actinic radiation.

11. The process of claim 3, wherein curing is conducted within a period of from 10 seconds to 2 minutes.

12. The process of claim 3, wherein the coating materials are applied by roller coating.

13. The process of claim 12, wherein application takes place by reverse roller coating with from 2 to 4 rolls.

14. The process of claim 12, wherein a pick-up roll has a peripheral speed of from 20 to 40% of a strip speed.

15. The process of claim 14, wherein an application roll has a peripheral speed of from 110 to 125% of the strip speed.

16. The process of claim 3, wherein at least one aqueous color and/or effect coating material as claimed in claim 2 is applied in a manner selected from the group consisting of
   (i) is applied directly to the strip and cured, to give at least one coating of the invention,
   (ii) is applied to at least one single-coat or multicoat coating system present on the strip, and is cured, to give likewise at least one coating of the invention,
   (iii) is applied wet-on-wet to at least one single-coat or multicoat coating film present on the strip, and the coating film(s) is (are) cured together, to give likewise at least one coating of the invention, and
   (iv) the cured or uncured film(s) is (are) coated with at least one coating material, after which the resultant coating film(s) is (are) cured alone or together with the film(s), to give likewise at least one coating of the invention.

17. The process of claim 3, wherein at least one coating material as claimed in claim 2
   (i) is applied directly to a strip or to an anti-adhesion coat present thereon, and is cured, to give at least one deformable color and/or effect basecoat, after which
   (ii) the basecoat is removed as a dry-paint film from the strip.

18. The method of claim 1 wherein the coated substrate is at least one of dry paint films, deformable color laminates, deformable effect laminates and mixtures thereof.

19. The coating material of claim 7, wherein the substituents in the radicals $R^1$, $R^2$, $R^3$ and/or $R^4$ of the compound (b) are selected from the group consisting of halogen atoms, nitrile groups, nitro groups, partially or fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy and cycloalkyloxy radicals; arylthio, alkylthio and cycloalkylthio radicals; hydroxyl groups; and/or primary, secondary and/or tertiary amino groups; and mixtures thereof.

* * * * *